Jan. 21, 1930.   J. T. FINNELLY ET AL   1,744,460
KETTLE BASE
Filed Feb. 18, 1929
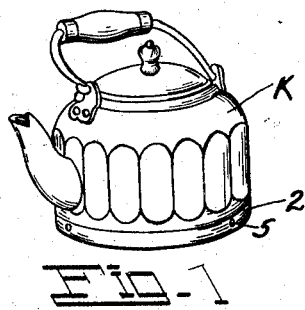
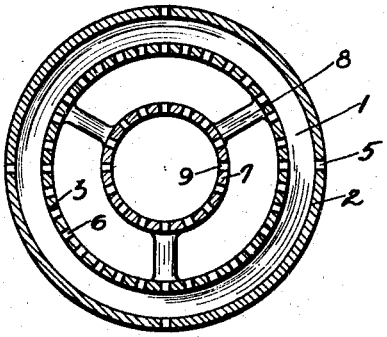
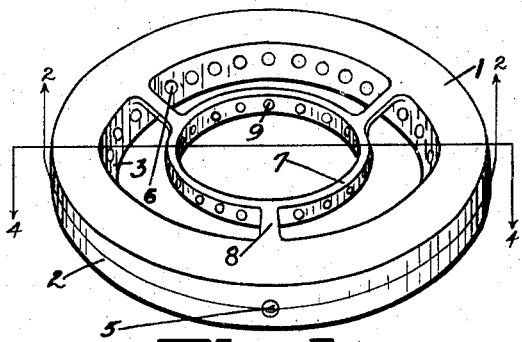
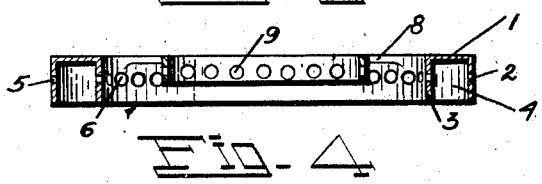
Grace Finnelly
John T. Finnelly  Inventor
By *Herbert E. Smith*
Attorney Patented Jan. 21, 1930

1,744,460

UNITED STATES PATENT OFFICE

JOHN T. FINNELLY AND GRACE FINNELLY, OF MULLAN, IDAHO

KETTLE BASE

Application filed February 18, 1929. Serial No. 340,876.

Our present invention relates to an improved kettle base or support for a kettle or other cooking utensil. The primary object of the invention is the provision of a support, adapted to rest upon the stove, or over a burner or heater, and perform the functions of supporting the utensil, as a kettle, and at the same time protect the bottom of the utensil against excessive heat from the burner. For instance, should the water in a kettle be evaporated by the heat from the burner and thus subject the bottom of the utensil to excessive heat from the burner, the device of our invention is designed to afford a protection, when used, for the bottom of the utensil that is being supported thereon, and prevent the heat from destroying the bottom of the utensil.

The base is fashioned of metal that is an exceptionally good conductor of heat and said base may be fashioned as a rigid portion of the utensil, or as hereinafter referred to, the base may be a separate article of manufacture, in various sizes or shapes.

The invention consists in certain novel combinations and arrangements of parts as will hereinafter be more fully set forth and claimed. In the accompanying drawings we have illustrated one complete example of the physical embodiment of our invention wherein the parts are combined and arranged according to the best mode we have thus far devised for the practical application of the principles of our invention, but it will be understood that various changes and alterations may be made therein, within the scope of our claim, without departing from the principles of our invention.

Figure 1 is a perspective view showing a kettle resting upon a device embodying our invention. Figure 2 is a horizontal sectional view at line 2—2, looking up, in Figure 3. Figure 3 is a perspective view of the device, and Figure 4 is a transverse sectional view at line 4—4 of Figure 3.

In order that the utility of the device may readily be understood we have shown a kettle K in Figure 1 resting upon or supported by the device of our invention, and it will of course be understood that other utensils may be supported on the base when the latter is used with a coal stove, gas burner, or electric heater as the case may be.

The base as shown is of circular shape and comprises a flat ring 1 that is fashioned with an outer flange 2 and an inner flange 3 that are spaced apart to provide an annular space or channel 4 to receive heated air currents from the heater on which the base is supported. A suitable number of vent openings 5 are provided in the outer flange 2, for admission of cool air currents from the atmosphere, or for movement of heated air currents in the opposite direction, from the channel 4. The inner flange is provided with a series of perforations or openings 6 to permit free movement of hot air currents between the channel 4 and the space within the flange 3.

Within the channel outer ring is located a smaller, concentric ring 7, which, as shown may terminate with its lower edge above the plane of the lower edge of the channel ring, in order that the hot air currents may have freedom of movement through the enclosed space within the channel ring. The inner, concentric ring is designed to afford additional support, for the central portion of the bottom of the kettle or other utensil, while the channel ring affords a support for the outer portion of the bottom of the utensil. The concentric inner ring 7 is fashioned integral with the outer channel ring, and the two rings are joined by three radiating arms 8 that are flush with the top surfaces of the inner and outer rings of the base. The top surfaces of the inner and outer rings and of the arms thus form the supporting members for the bottom of the kettle or other utensil. The inner concentric ring is also perforated, as at 9, the series of openings extending around the ring, and it will be apparent that the heated air currents from the heater below the base may have free circulation between the annular channel 4 and the enclosed space within the channel ring, as well as under the inner ring, and through the perforations in the inner ring. Thus the heated air currents are prevented from coming in direct contact with the bottom of the kettle in such manner as would scorch or burn the bottom of the kettle in the absence of water, and yet at the same time the required heat is radiated through the base to the kettle for cooking purposes, or for other purposes.

Having thus fully described our invention, what we claim as new and desire to secure by Letters Patent is:—

A base for a cooking utensil comprising an outer channel ring having perforations in its walls, an inner concentric, perforated ring having its upper face flush with the upper face of the outer ring and its lower edge terminating above the plane of the lower edge of said ring, and radiating arms integral with the outer and inner rings.

In testimony whereof we affix our signatures.

JOHN T. FINNELLY.
GRACE FINNELLY.